US011900876B2

(12) United States Patent
Wang

(10) Patent No.: US 11,900,876 B2
(45) Date of Patent: Feb. 13, 2024

(54) DISPLAY PANEL, METHOD FOR DRIVING THE SAME, AND DISPLAY APPARATUS

(71) Applicants: WUHAN TIANMA MICROELECTRONICS CO., LTD., Wuhan (CN); Wuhan Tianma Microelectronics Co., Ltd. Shanghai Branch, Shanghai (CN)

(72) Inventor: Yaolin Wang, Wuhan (CN)

(73) Assignees: WUHAN TIANMA MICROELECTRONICS CO., LTD., Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 17/841,473

(22) Filed: Jun. 15, 2022

(65) Prior Publication Data

US 2022/0310015 A1 Sep. 29, 2022

(30) Foreign Application Priority Data

Mar. 31, 2022 (CN) ........................ 202210342828.X

(51) Int. Cl.
*G09G 3/3233* (2016.01)

(52) U.S. Cl.
CPC ... *G09G 3/3233* (2013.01); *G09G 2300/0861* (2013.01); *G09G 2310/0251* (2013.01); *G09G 2310/062* (2013.01); *G09G 2310/08* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS 8,446,345 B2 * 5/2013 Yu ........................ G09G 3/3233 345/76
2002/0044140 A1 * 4/2002 Inukai .................. G09G 3/3291 345/204
2005/0259703 A1 * 11/2005 You ...................... G09G 3/3233 372/38.07
2006/0250331 A1 * 11/2006 Sempel ................ G09G 3/3241 345/76
2007/0114522 A1 * 5/2007 Kwok .................. H10K 59/176 257/40
2007/0115226 A1 * 5/2007 Jung .................... G09G 3/3233 345/76
2008/0074356 A1 * 3/2008 Cok ..................... G09G 3/3233 345/76

(Continued)

FOREIGN PATENT DOCUMENTS

CN 110085646 A 8/2019

*Primary Examiner* — Dorothy Harris
(74) *Attorney, Agent, or Firm* — CHRISTENSEN O'CONNOR JOHNSON KINDNESS PLLC

(57) ABSTRACT

A display panel, a method for driving the same, and a display apparatus are provided. The display panel includes a plurality of light-emitting elements. Each one of the light-emitting element is electrically connected to M pixel circuits, where M is a positive integer greater than or equal to 2. The M pixel circuits are configured to drive the light-emitting element to emit light respectively during different display phases of the display panel.

25 Claims, 11 Drawing Sheets

(56) References Cited

U.S. PATENT DOCUMENTS

| | | | | |
|---|---|---|---|---|
| 2008/0180364 | A1* | 7/2008 | Kim | G09G 3/3233<br>345/76 |
| 2008/0284691 | A1* | 11/2008 | Chung | G09G 3/3225<br>345/76 |
| 2011/0057919 | A1* | 3/2011 | Kim | G09G 3/3233<br>345/82 |
| 2020/0357875 | A1* | 11/2020 | Wang | H10K 59/131 |

* cited by examiner

DISPLAY PANEL, METHOD FOR DRIVING THE SAME, AND DISPLAY APPARATUS

CROSS-REFERENCE TO RELATED APPLICATION

The present application claims priority to Chinese Patent Application No. 202210342828.X, filed on Mar. 31, 2022, the content of which is incorporated herein by reference in its entirety.

TECHNICAL FIELD

The present disclosure relates to the field of display technologies, and, particularly, relates to a display panel, a method for driving a display panel, and a display apparatus.

BACKGROUND

An organic light emitting diode (OLED) display panel includes a light-emitting element. In the related art, a light-emitting element is electrically connected to a pixel circuit, and each time the display panel is refreshed, the pixel circuit drives the light-emitting element to emit light once, so that the operating frequency of the pixel circuit is consistent with the refresh frequency of the display panel. When the display panel is refreshed at a frequency of 120 Hz, the operating frequency of the pixel circuit is also 120 Hz.

As a result, when the display panel is refreshed at a high frequency, the pixel circuit also needs to maintain to a high operating frequency, so that life loss of transistors in the pixel circuit is larger, thus affecting the performance of the display panel.

SUMMARY

A first aspect of the present disclosure provides a display panel. The display panel includes a plurality of light-emitting elements. Each one of the light-emitting elements is electrically connected to M pixel circuits, M is a positive integer greater than or equal to 2. The M pixel circuits are configured to drive the plurality of light-emitting elements to emit light respectively during different display phases of the display panel.

A second aspect of the present disclosure provides a method for driving a display panel, which is configured to drive the above display panel. The method includes: controlling the M pixel circuits to drive one of the plurality of light-emitting elements to emit light respectively during different display phases of the display panel.

A third aspect of the present disclosure provides a display apparatus. The display apparatus includes the display panel as above.

BRIEF DESCRIPTION OF DRAWINGS

In order to more clearly illustrate technical solutions of embodiments of the present disclosure, the accompanying drawings used in the embodiments are briefly described below. The drawings described below are merely some embodiments of the present disclosure. Based on these drawings, those skilled in the art can obtain other drawings.

DESCRIPTION OF EMBODIMENTS

In order to better understand the technical solutions of the present disclosure, the embodiments of the present disclosure are described in detail below with reference to the accompanying drawings.

It should be clear that the described embodiments are only a part of the embodiments of the present disclosure, but not all embodiments. Based on the embodiments in the present disclosure, other embodiments obtained by those of ordinary skill in the art fall within the protection scope of the present disclosure.

The terms used in the embodiments of the present disclosure are only for the purpose of describing specific embodiments, and are not intended to limit the present disclosure. As used in the embodiments of this application and the appended claims, the singular forms "a," "the," and "the" are intended to include the plural forms as well, unless the context clearly dictates otherwise.

It should be understood that the term "and/or" used in this document is only an association relationship to describe the associated objects, indicating that there can be three relationships, for example, A and/or B, which can indicate that A alone, A and B, and B alone. The character "/" in the present description generally indicates that the related objects are an "or" relationship.

Figure 1:
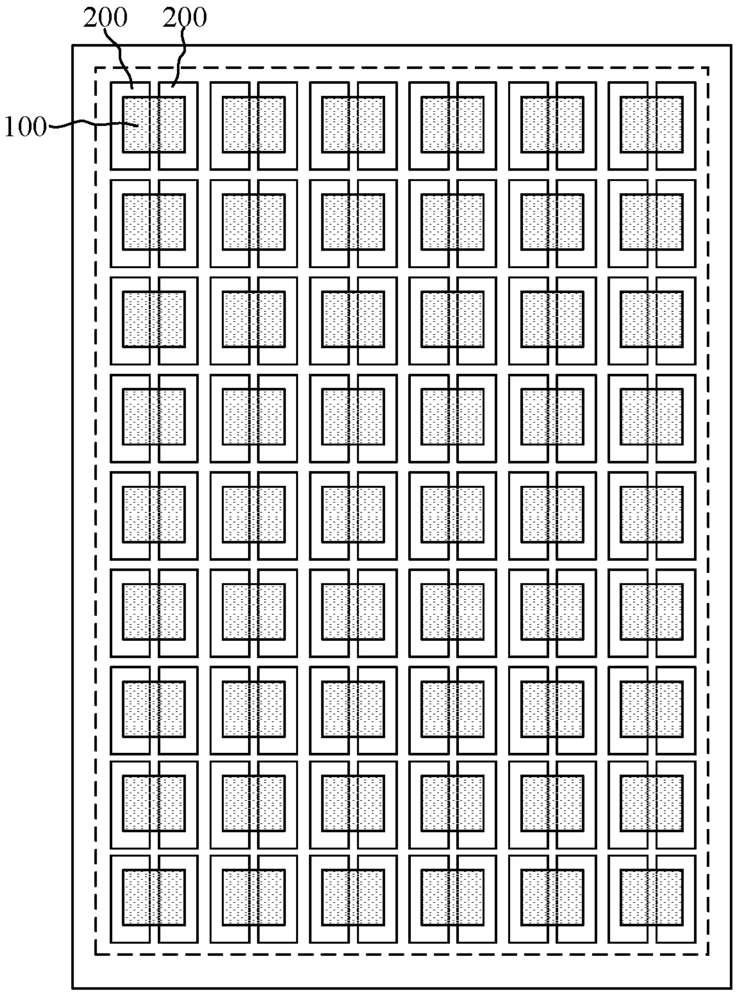
FIG. 1 is a structural schematic diagram of a display panel provided by embodiments of the present disclosure.
Figure 2:
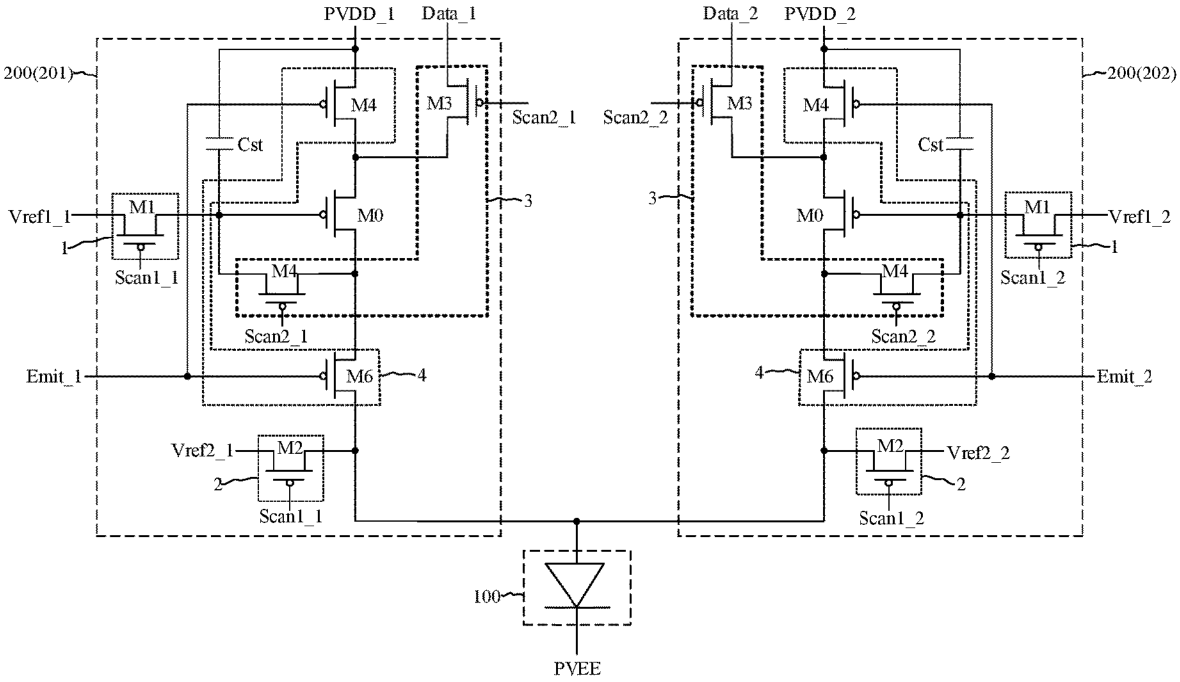
FIG. 2 is a schematic diagram of a connection between a light-emitting element and a pixel circuit provided by embodiments of the present disclosure.

The present disclosure provides a display panel. FIG. 1 is a structural schematic diagram of a display panel provided by some embodiments of the present disclosure, and FIG. 2 is a schematic diagram of a connection between a light-emitting element and a pixel circuit provided by some embodiments of the present disclosure. As shown in FIG. 1 and FIG. 2, the display panel includes multiple light-emitting elements 100. One light-emitting element 100 is electrically connected to M pixel circuits 200, where M is a positive integer greater than or equal to 2. The M pixel circuits 200 are configured to drive the light-emitting element 100 to emit light respectively during different display phases D of the display panel.

In some embodiments of the present disclosure, the display phase D can be an integral multiple of one frame period. For example, the display phase D can include one frame period or can include multiple adjacent frame periods. By setting a multiple relationship between the display phase D and one frame period, the M pixel circuits 200 can operate in a preset sequence.

Taking M=2 as an example, when the display phase D includes one frame period, the two pixel circuits 200 can operate in a following sequence, that is, a first one of the two pixel circuits 200 drives the light-emitting element 100 to emit light during an odd-numbered frame period, and a second one of the two pixel circuits 200 drives the light-emitting element 100 to emit light during an even-numbered frame period. When the display phase D includes m adjacent frame periods, the two pixel circuits 200 can operate in a following sequence. That is, the first one of the two pixel circuits 200 drives the light-emitting element 100 to emit light during a first frame period to an $m^{th}$ frame period, and the second one of the two pixel circuits 200 drives the light-emitting element 100 to emit light during an $(m+1)^{th}$ frame period to a $(2\ m)^{th}$ frame period; the first one of the two pixel circuits 200 drives the light-emitting element 100 to emit light during a $(2\ m+1)^{th}$ frame period to a $(3\ m)^{th}$ frame period, and the second one of the two pixel circuits 200 drives the light-emitting element 100 to emit light during a $(3\ m+1)^{th}$ frame period to a $(4\ m)^{th}$ frame period; and so on.

In the embodiments of the present disclosure, one light-emitting element 100 is electrically connected to multiple pixel circuits 200, and the multiple pixel circuits 200 are controlled to drive the light-emitting element 100 to emit light respectively during different display phases D, thereby reducing the operating frequency of each pixel circuit 200 connected to the light-emitting element 100 while ensuring a high light-emitting frequency of the light-emitting element 100.

Exemplarily, when two pixel circuits 200 alternately drive the light-emitting element 100 to emit light during different frame periods, the operating frequency of each pixel circuit 200 can be only a half of the refresh frequency of the display panel. When the display panel is refreshed at a high frequency of 120 Hz, the operating frequency of each pixel circuit 200 is only 60 Hz, so that the operating frequency of the pixel circuit 200 is reduced.

Therefore, using the technical solutions provided by the embodiments of the present disclosure, the high-frequency refresh of the display panel enables each pixel circuit 200 to operate at a relatively low frequency, thereby effectively decreasing the life loss of the transistor in the pixel circuit 200. In other words, since the operating frequency of the pixel circuit 200 in the embodiments of the present disclosure does not need to be consistent with the refresh frequency of the display panel, the refresh frequency of the display panel can be improved while ensuring that the pixel circuit 200 operates at a relatively low frequency, thereby improving the display effect.

In some embodiments, referring to FIG. 2 again, M=2, that is, one light-emitting element 100 is electrically connected to only two pixel circuits 200. At this time, under the premise of decreasing the operating frequency of a single pixel circuit 200, the number of pixel circuits 200 connected to the same light-emitting element 100 is small, and the space occupied by the pixel circuits 200 of a single sub-pixel in the display panel will not be excessively large, so that a better resolution can be achieved.

Before describing the following solutions, the present disclosure describes the operating principle of the pixel circuit 200 with reference to the structure of the pixel circuit 200, so as to describe the subsequent solutions more clearly.

The pixel circuit 200 provided by some embodiments of the present disclosure is configured to execute a reset phase t1, a data writing phase t2, and a light-emitting control phase t3 in sequence within its work cycle. Referring to FIG. 2, the pixel circuit 200 includes a driving transistor M0, a gate reset module 1, an anode reset module 2, a charging module 3, and a light-emitting control module 4.

The gate reset module 1 is electrically connected to a first scanning signal line Scan1, a first reset signal line Vref1, and a gate electrode of the driving transistor M0. The gate reset module 1 is configured to write a gate reset signal provided by the first reset signal line Vref1 to a gate electrode of the driving transistor M0 in response to a first scanning signal provided by the first scanning signal line Scan1 during the reset phase t1 executed by the pixel circuit 200, so as to reset the gate electrode of the driving transistor M0.

The anode reset module 2 is electrically connected to the first scanning signal line Scan1, a second reset signal line Vref2, and an anode of the light-emitting element 100. The anode reset module 2 is configured to write an anode reset signal provided by the second reset signal line Vref2 to the anode of the light-emitting element 100 in response to the first scanning signal provided by the first scanning signal line Scan1 during the reset phase t1 executed by the pixel circuit 200, so as to reset the anode of the light-emitting element 100.

The charging module 3 is electrically connected to the second scanning signal line Scan2, a data line Data, a first electrode of the driving transistor M0, a second electrode of the driving transistor M0, and the gate electrode of the driving transistor M0. The charging module 3 is configured to, in respond to a second scanning signal provided by the second scanning signal line Scan2, write a data signal provided by the data line Data to the gate electrode of the driving transistor M0, and to compensate a threshold of the driving transistor M0 during the data writing phase t2 executed by the pixel circuit 200

The light-emitting control module 4 is electrically connected to a light-emitting control signal line Emit, a power supply signal line PVDD, the first electrode of the driving transistor M0, the second electrode of the driving transistor M0, and the anode of the light-emitting element 100. The light-emitting control module 4 is configured to transmit a driving current converted by the driving transistor M0 to the anode of the light-emitting element 100 in response to the light-emitting control signal provided by the light-emitting control signal line Emit during the light-emitting control stage t3 executed by the pixel circuit 200, so as to drive the light-emitting element 100 to emit light.

It can be seen that the pixel circuit 200 operates under the driving of the first scanning signal line Scan1, the second scanning signal line Scan2 and the light-emitting control signal line Emit.

In view of the above, in some embodiments, referring to FIG. 2 again, M pixel circuits 200 electrically connected to the same light-emitting element 100 are electrically connected to different scanning signal lines, respectively, and M pixel circuits 200 electrically connected to the same light-emitting element 100 are electrically connected to different light-emitting control signal lines Emit.

In combination with the above contents, the M pixel circuits 200 that are electrically connected to the same light-emitting element 100 are electrically connected to different scanning signal lines, respectively, meaning that: the M pixel circuits 200 electrically connected to the same light-emitting element 100 are electrically connected to the M first scanning signal lines in one-to-one correspondence, and the M first scanning signal lines Scan1 are configured to provide effective levels during different display phases D, respectively. The M second scanning signal lines Scan2 are electrically connected the M pixel circuits 200 electrically connected to the same light-emitting element 100 in one-to-one correspondence, and the M second scanning signal lines Scan2 are configured to provide effective levels during different display phases D, respectively.

The M pixel circuits 200 electrically connected to the same light-emitting element 100 are electrically connected to different light-emitting control signal lines Emit, respectively, meaning that: the M pixel circuits 200 electrically connected to the same light-emitting element 100 are electrically connected to the M light-emitting control signal lines Emit in one-to-one correspondence, and the M light-emitting control signal lines Emit are configured to provide effective levels during different display phases D, respectively.

For a better understanding, in FIG. 2, M first scanning signal lines Scan1 electrically connected to the M pixel circuits 200 are represented by reference signs Scan1_1 to Scan1_M, respectively, and M second scanning signals electrically connected to the M pixel circuits 200 lines Scan2 are represented by reference signs Scan2_1 to Scan2_M, respectively, and M light-emitting control signal lines Emit electrically connected to the M pixel circuits 200 are represented by reference signs Emit_1 to Emit_M, respectively.

Figure 3:
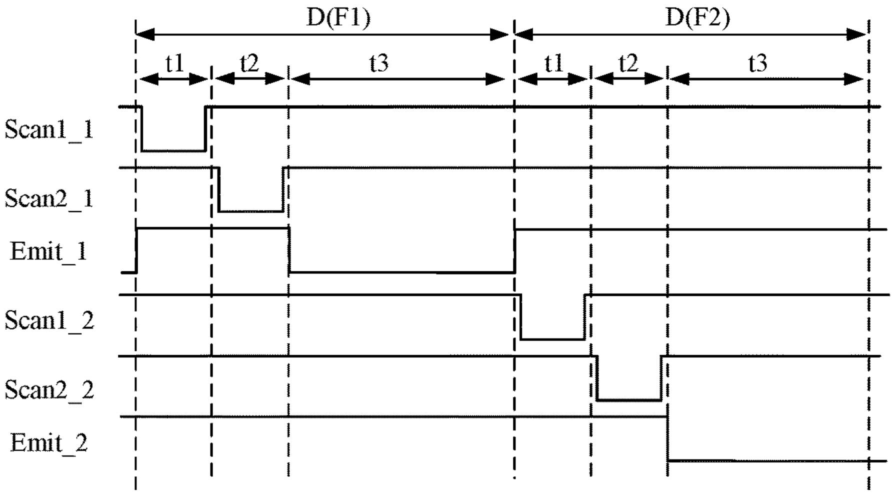
FIG. 3 is a timing sequence provided by embodiments of the present disclosure.

Taking M=2, the display phase D including a frame period, and two pixel circuits 200 alternately driving the light-emitting element 100 to emit light as an example, as shown in FIG. 3 that is a timing sequence provided by some embodiments of the present disclosure, during a first frame period F1, the first pixel circuit 200 executes the reset phase t1 in response to an effective level (low level) provided by the first scanning signal line Scan1_1, and then executes the data writing phase t2 in response to an effective level (low level) provided by the second scanning signal line Scan2, and finally executes the light-emitting control phase t3 in response to an effective level (low level) provided by the light-emitting control signal line Emit_1. During the first frame period F1, the first scanning signal line Scan1_2, the second scanning signal line Scan2_2, and the light-emitting control signal line Emit_2 all provide ineffective levels (high levels).

During the second frame period F2, the second pixel circuit 200 executes the reset phase t1 in response to an effective level (low level) provided by the first scanning signal line Scan1_2, and then executes the data writing phase t2 in response to an effective level (low level) provided by the second scanning signal line Scan2_2, and finally executes the light-emitting control phase t3 in response to an effective level (low level) provided by the light-emitting control signal line Emit_2. During the second frame period F2, the first scanning signal line Scan1_1, the second scanning signal line Scan2_1, and the light-emitting control signal line Emit 1 all provide ineffective levels (high levels).

With the above-described configuration, it can be realized that an $i^{th}$ pixel circuit 200 operates during only the display phase D during which each of the first scanning signal line Scan1_*i*, the second scanning signal line Scan2_*i*, and the light-emitting control signal line Emit_i provides effective levels, and the $i^{th}$ pixel circuit 200 does not operate during other display phases D, thereby effectively reducing the operating frequency of the pixel circuit 200, and lengthening the lifespan of the transistors in the pixel circuit 200.

Figure 4:
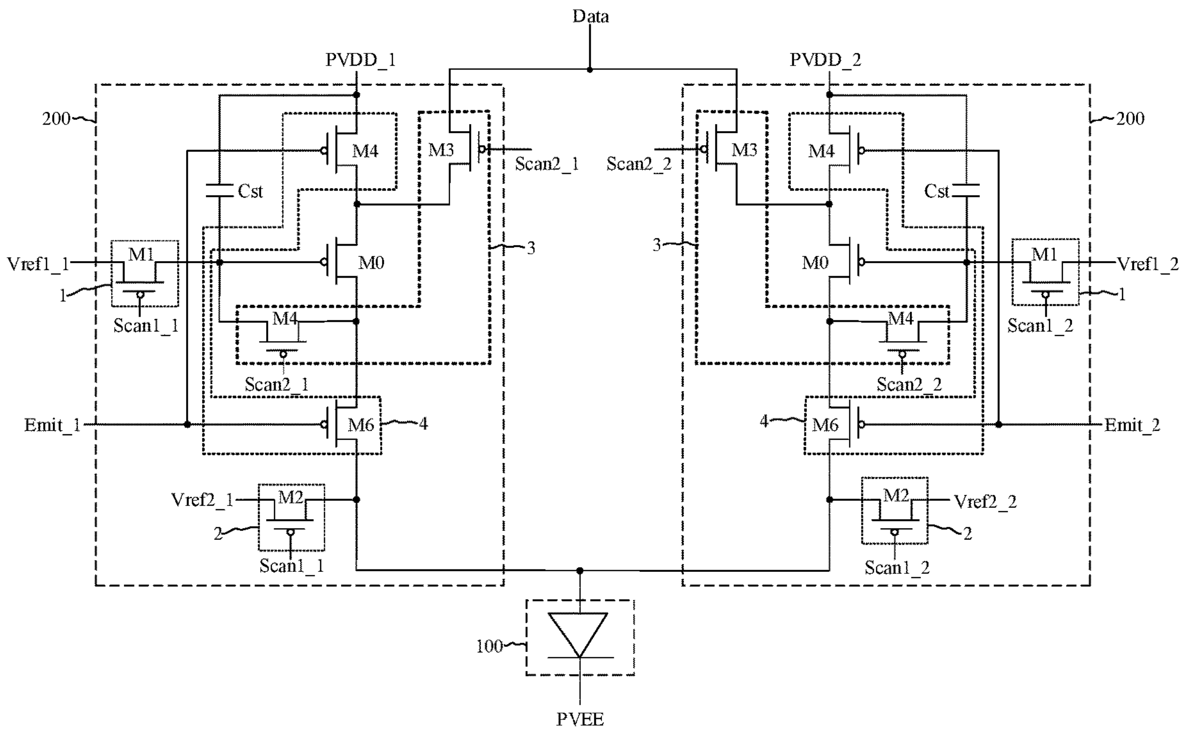
FIG. 4 is a schematic diagram of a connection between M pixel circuits and data lines provided by embodiments of the present disclosure.

FIG. 4 is a schematic diagram of a connection between M pixel circuits and data lines provided by some embodiments of the present disclosure. In some embodiments, as shown in FIG. 4, the display panel can include data lines configured to provide data signals Data, and M pixel circuits 200 electrically connected to the same light-emitting element 100 are electrically connected to the same data line Data.

Since the M pixel circuits 200 are configured to drive the light-emitting element 100 to emit light respectively during different display phases D, the data writing phases t2 executed by the M pixel circuits 200 are staggered from each other, and at the same moment, the data signal transmitted on the data line Data can be written to only the pixel circuit 200 that is executing the data writing phase t2, and will not be transmitted to other pixel circuits 200, so that the state of other pixel circuits 200 will not be affected.

With such a configuration, multiple pixel circuits 200 electrically connected to the same light-emitting element 100 just need to be connected to one data line Data, which can decrease the number of data lines Data in the display panel and save wiring space.

In some embodiments of the present disclosure, when one light-emitting element 100 is electrically connected to two pixel circuits 200, referring to FIG. 4, in the layout design of the pixel circuit 200, the two pixel circuits 200 can be symmetrically arranged, which makes the transistors in the two pixel circuits 200 electrically connected to the data line Data to be closer to each other, thereby reducing a length of a lead located between the data line Data and each of the transistors.

Figure 5:
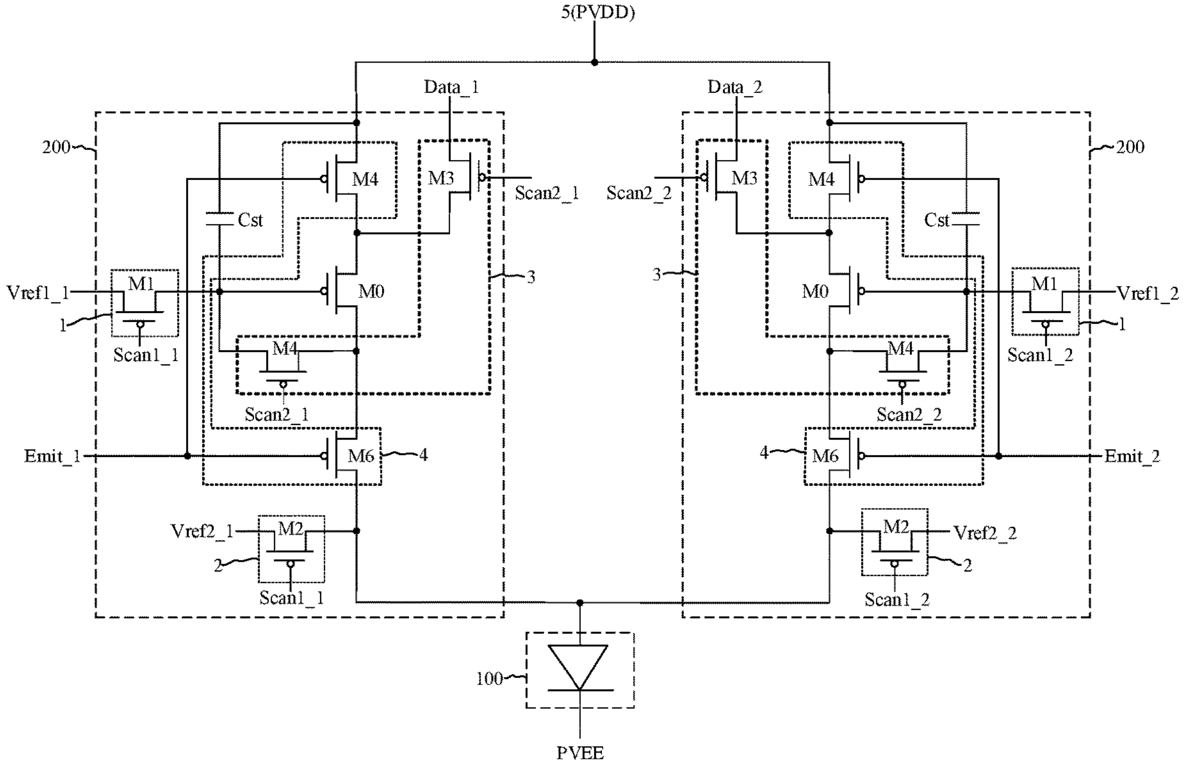
FIG. 5 is a schematic diagram of a connection between M pixel circuits and a constant potential signal line provided by embodiments of the present disclosure.
Figure 6:
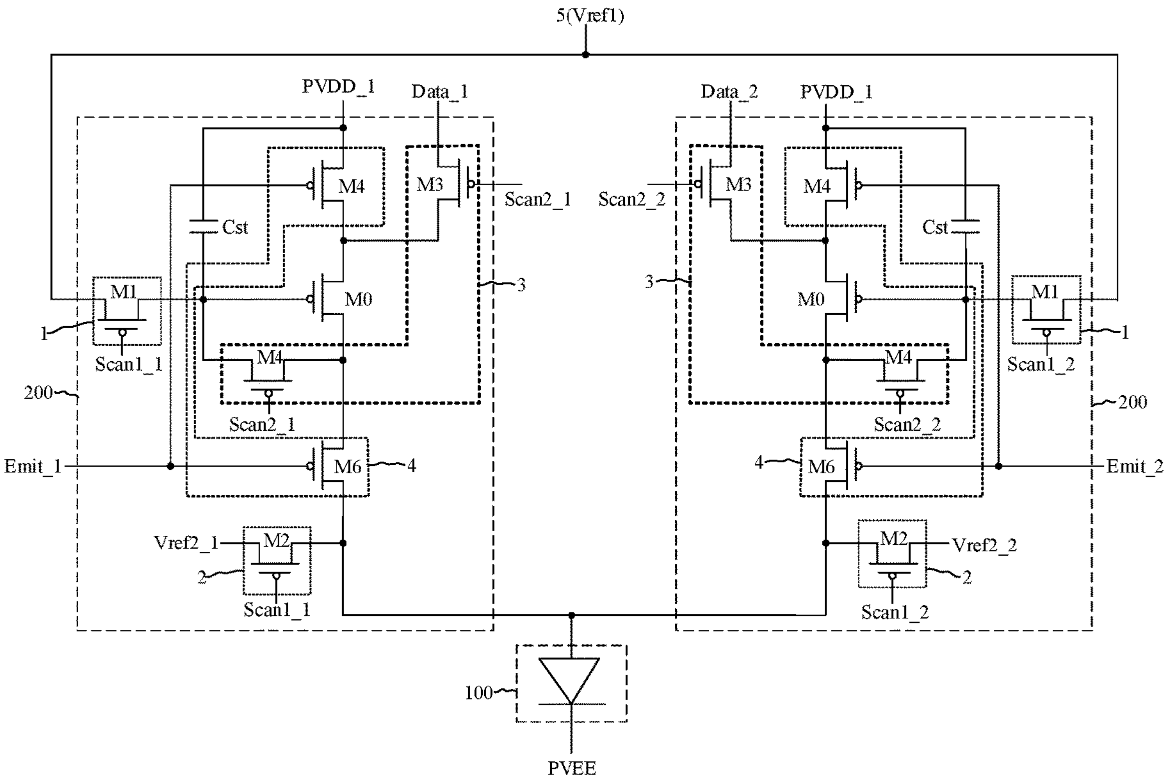
FIG. 6 is another schematic diagram of a connection between M pixel circuits and a constant potential signal line provided by embodiments of the present disclosure.
Figure 7:
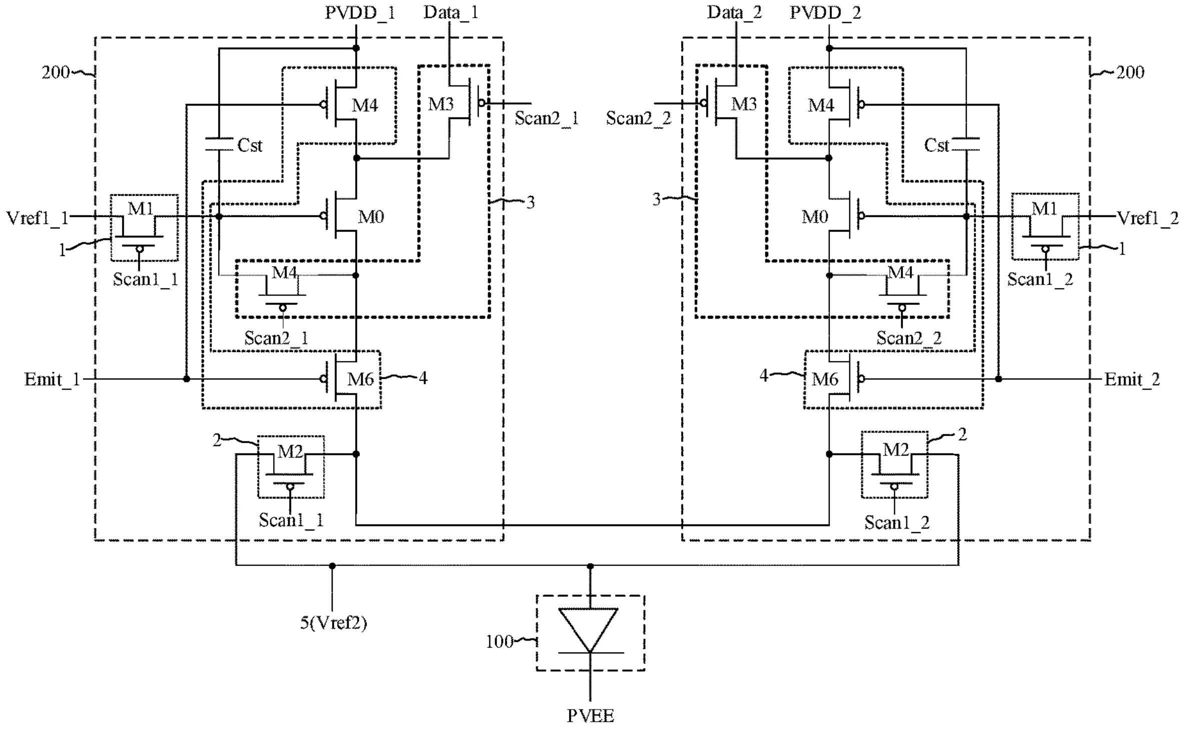
FIG. 7 is another schematic diagram of a connection between M pixel circuits and a constant potential signal line provided by embodiments of the present disclosure.

FIG. 5 is a schematic diagram of a connection between M pixel circuits and a constant potential signal line provided by some embodiments of the present disclosure, and FIG. 6 is another schematic diagram of a connection between M pixel circuits and a constant potential signal line provided by some embodiments of the present disclosure. FIG. 7 is another schematic diagram of a connection between M pixel circuits and a constant potential signal line provided by some embodiments of the present disclosure. In some embodiments, as shown in FIG. 5 to FIG. 7, the display panel further includes a constant potential signal line 5 configured to provide a data signal. M pixel circuits 200 electrically connected to a same light-emitting element 100 are electrically connected to a same constant potential signal line 5, so that the number of the constant potential signal lines 5 in the display panel can be reduced, thereby saving the wiring space.

In some embodiments, with reference to FIG. 2, the display panel can include a first reset signal line Vref1 configured to provide a gate reset signal, a second reset signal line Vref2 configured to provide an anode reset signal, and a power supply signal line PVDD configured to provide a power supply signal. With reference to FIG. 5 to FIG. 7, the constant potential signal line 5 can include at least one of the first reset signal line Vref1, the second reset signal line Vref2, or the power supply signal line PVDD, so as to reduce the number of the first reset signal line Vref1, the second reset signal line Vref2, and/or the power supply signal line PVDD in the display panel.

Figure 8:
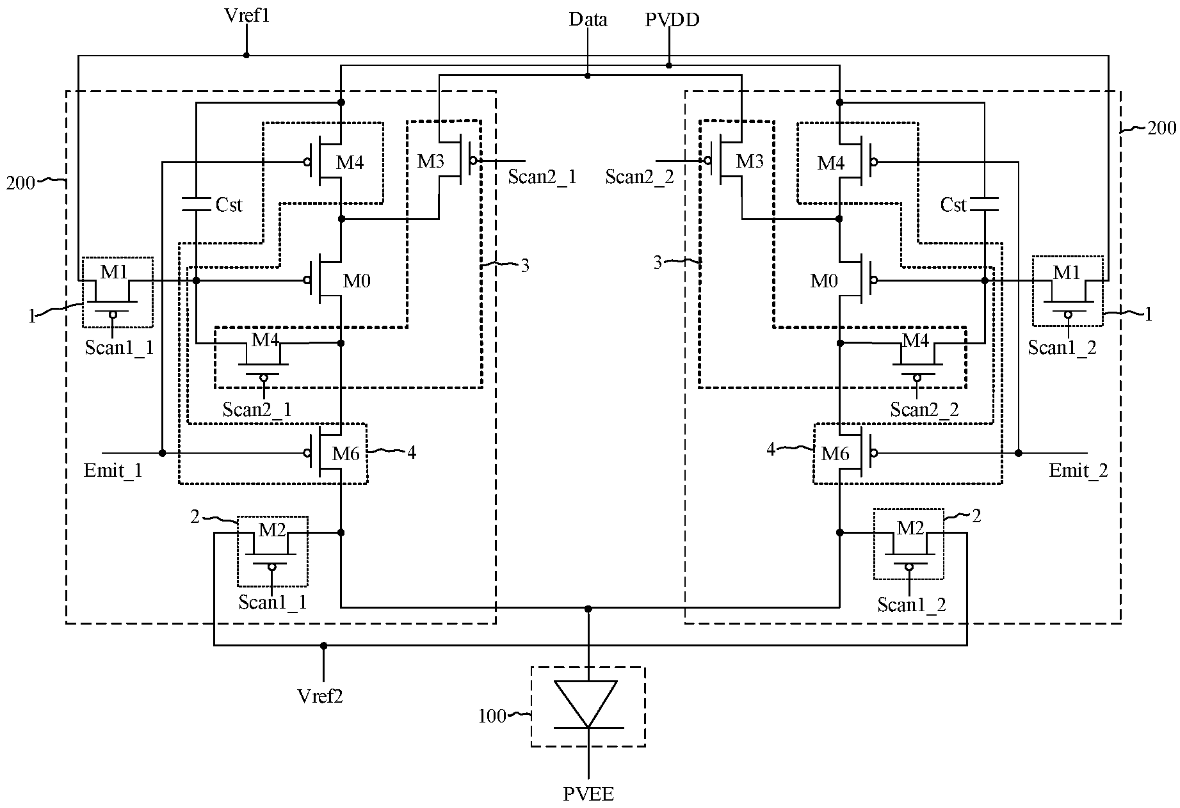
FIG. 8 is another schematic diagram of a connection among M pixel circuits, data lines, and a constant potential signal line provided by embodiments of the present disclosure.

FIG. 5 to FIG. 7 each illustrate the case where the constant potential signal line 5 includes only one of the first reset signal line Vref1, the second reset signal line Vref2, and the power supply signal line PVDD. In other embodiments of the present disclosure, the constant potential signal line 5 can also include at least two of the first reset signal line Vref1, the second reset signal line Vref2, or the power supply signal line PVDD. FIG. 8 is another schematic diagram of a connection between M pixel circuits, a data line, and a constant potential signal line provided by some embodiments of the present disclosure. Exemplarily, as shown in FIG. 8, M pixels circuits 200 electrically connected to a same light-emitting element 100 are electrically connected to a same data line Data. At the same time, the M pixel circuits 200 are also electrically connected to a same first reset signal line Vref1, a same second reset signal line Vref2, and a same power supply signal line PVDD, so as to save wiring space.

In some embodiments of the present disclosure, the second reset voltage provided by the second reset signal line Vref2 can be smaller than the first reset voltage provided by the first reset signal line Vref1, so that a lower second reset voltage is used to reset the anode of the light-emitting element 100 during the reset phase t1 of the pixel circuit 200, and the light-emitting element 100 does not emit light more completely, thereby avoiding the flickering phenomenon caused by the undesired light-emitting of the light-emitting element 100.

In some embodiments, the pixel circuit 200 sequentially executes the reset phase t1, the data writing phase t2 and the light-emitting control phase t3 within the display phase D during which the pixel circuit 200 operates. Referring to FIG. 3 again, the light-emitting control phases t3 executed by the M pixel circuits 200 do not overlap with one another.

At this time, during the light-emitting control stage t3 executed by a certain pixel circuit 200, the light-emitting element 100 can only receive the driving current transmitted by the pixel circuit 200 and emit light under the driving current, so that a situation where the light-emitting element 100 receives the driving currents transmitted by the multiple pixel circuits 200 does not occur, thereby increasing the brightness accuracy.

In some embodiments, referring to FIG. 2 and FIG. 3, the M pixel circuits 200 include a first pixel circuit 201 and a second pixel circuit 202, and the display phase D executed by the first pixel circuit 201 and the display phase D executed by the second pixel circuit executed by the second pixel circuit 202 do not overlap with each other.

In this way, the display phase D of the first pixel circuit 201 and the display phase D of the second pixel circuit 202 are staggered from each other. After the light-emitting control phase t3 executed by the first pixel circuit 201 is completed, the second pixel circuit 202 starts to execute the reset phase t1, and the first pixel circuit 201 and the second pixel circuit 202 do not interfere with each other, resulting in high operation reliability of the pixel circuit 200.

When the display phase D executed by the first pixel circuit 201 and the display phase D executed by the second pixel circuit 202 do not overlap with each other, still taking M=2, and the first pixel circuit 201 and the second pixel circuit 202 alternatively operating during different frame periods as an example, the operating frequency of the first pixel circuit 201 and the operating frequency of the second pixel circuit 202 each are a half of the refresh frequency of the display panel. In this case, the second pixel circuit 202 does not operate during the display phase D during which the first pixel circuit 201 operates, so here the entire display phase D of the first pixel circuit 201 can be regarded as a holding time of the second pixel circuit 202. Similarly, the display phase D during which the second pixel circuit 202 operates can be regarded as a holding time of the first pixel circuit 201. In this way, a cycle length of the pixel circuit 200 is lengthened by lengthening the holding time of the pixel circuit, thereby decreasing the operating frequency of the pixel circuit 200. Therefore, with such a configuration, duration of the reset phase t1 and duration of the data writing phase t2 executed by each pixel circuit 200 are not prolonged as the operating frequency of the pixel circuit 200 decreases, but still corresponds to the reset time and the data writing time at a relatively high refresh frequency.

For example, when the refresh frequency of the display panel is 120 Hz, although the operating frequencies of the two pixel circuits 200 each are reduced to 60 Hz, the reset time and data writing time of the two pixel circuits 200 still correspond to the reset time and data writing time at 120 Hz.

It can be understood that the longer the reset time and the data writing time, the more sufficient reset and charging will be, and the better the display effect will be. In many embodiments, the reset time and data writing time are usually longer than 8 μs to ensure a better display effect. In the related art, the reset time and data writing time at 120 Hz can barely reach 8 μs, while the reset time and data writing time at a higher frequency, such as 144 Hz, 240 Hz, or 360 Hz, can only be compressed to shorter than 4 μs. The reset time and charging time are very short, resulting in insufficient reset and insufficient charging, which in turn causes problems of the display panel, such as color casts, bright and dark spots, smears, or split screen.

In some embodiments, with reference to FIG. 2 and FIG. 9 to FIG. 15, when the M pixel circuits 200 include the first pixel circuit 201 and the second pixel circuit 202, and the display phase D executed by the first pixel circuit 201 and the display phase D executed by the second pixel circuit 202 overlap with each other.

In this way, there is no need for the second pixel circuit 202 to wait to operate until the first pixel circuit 201 finishes its operation. When the first pixel circuit 201 executes the reset phase t1, the data writing phase t2, or the light-emitting control phase t3, the second pixel circuit 202 can execute the reset phase t1, which is equivalent to shorten the holding time of the second pixel circuit 202 in the entire work cycle. In this way, the reset phase t1 and/or the data writing phase t2 executed by the second pixel circuit 202 can be lengthened to a certain extent, thereby extending the reset time and/or the charging time of the second pixel circuit 202.

The reset time and the charging time of the second pixel circuit 202 are extended while the reset time and the charging time of the first pixel circuit 201 can remain unchanged or can be extended. For example, the reset time of the first pixel circuit 201 can be extended to be equal to the reset time of the second pixel circuit 202, and the charging time of the first pixel circuit 201 can be extended to be equal to the charging time of the second pixel circuit 202, so that the two pixel circuits 200 have a uniform reset effect and a uniform charging effect.

Figure 9:
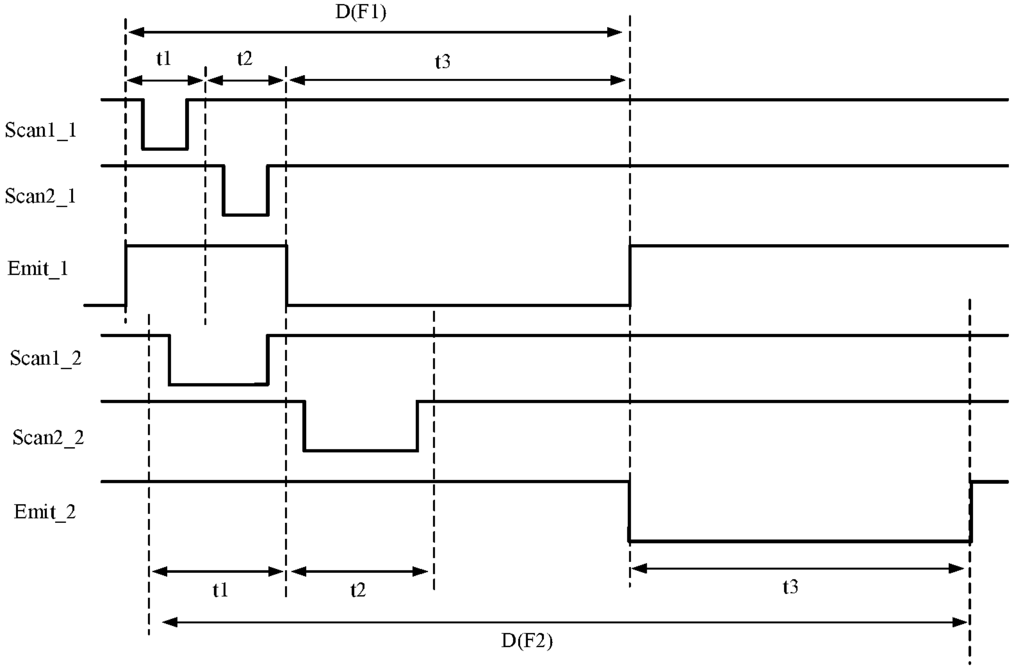
FIG. 9 is another timing sequence provided by embodiments of the present disclosure.
Figure 10:
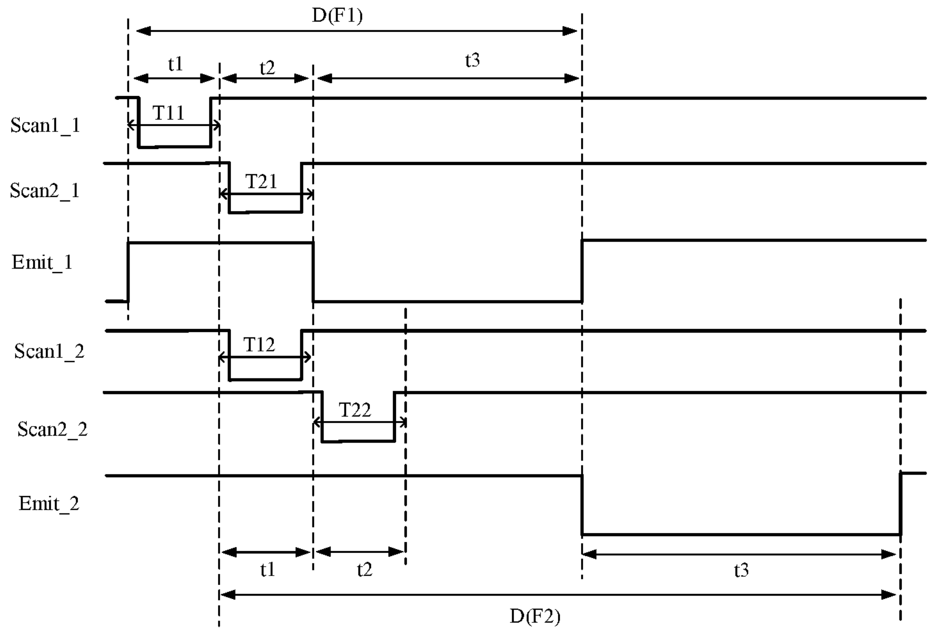
FIG. 10 is another timing sequence provided by embodiments of the present disclosure.

FIG. 9 is another timing sequence provided by some embodiments of the present disclosure, and FIG. 10 is another timing sequence provided by some embodiments of the present disclosure. In some embodiments, as shown in FIG. 9 and FIG. 10, the pixel circuit 200 executes the reset phase t1, the data writing phase t2, and the light-emitting control phase t3 in sequence within the display phase D during which the pixel circuit 200 operates. The data writing phase t2 executed by the first pixel circuit 201 and the reset phase t1 executed by the second pixel circuit 202 overlap with each other, and the light-emitting control phase t3 executed by the first pixel circuit 201 and the data writing phase t2 executed by the second pixel circuit 202 overlap with each other.

With such a configuration, when the first pixel circuit 201 executes the reset phase t1 or the data writing phase t2, the second pixel circuit 202 can start to execute the reset phase t1, so that the reset phase t1 executed by the second pixel circuit 202 and/or the data writing phase t2 executed by the second pixel circuit 202 can be extended. For example, the reset time and/or the charging time of the second pixel circuit 202 can be extended from an original duration corresponding to 120 Hz to a duration corresponding to 90 Hz, or even to the duration corresponding to 60 Hz, to double the duration, which extends the reset time and the charging time of the second pixel circuit 202 and optimizes the light-emitting performance of driving the light-emitting element 100 to emit light by the second pixel circuit 202.

Figure 11:
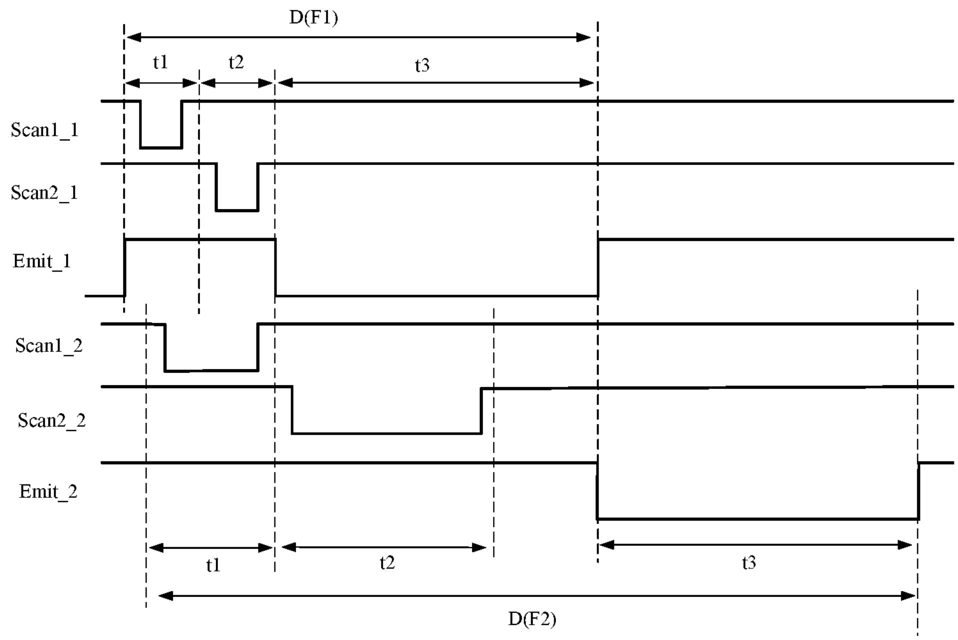
FIG. 11 is another timing sequence provided by embodiments of the present disclosure.

When the reset phase t1 executed by the second pixel circuit 202 and/or the data writing phase t2 executed by the second pixel circuit 202 is extended, the two phases can have a same duration, which is shown in FIG. 9. FIG. 11 is another timing sequence provided by some embodiments of the present disclosure. In some embodiments, as shown in FIG. 11, the reset phase t1 executed by the second pixel circuit 202 and the data writing phase t2 executed by the second pixel circuit 202 can have different durations. For example, the data writing phase t2 executed by the pixel circuit 202 can be extended to a greater extent to improve the charging effect. In the case where the reset phase t1 and the data writing phase t2 that are executed by the second pixel circuit 202 are extended to different degrees, only two shift registers can be provided to provide a first scanning signal and a second scanning signal, respectively.

Figure 12:
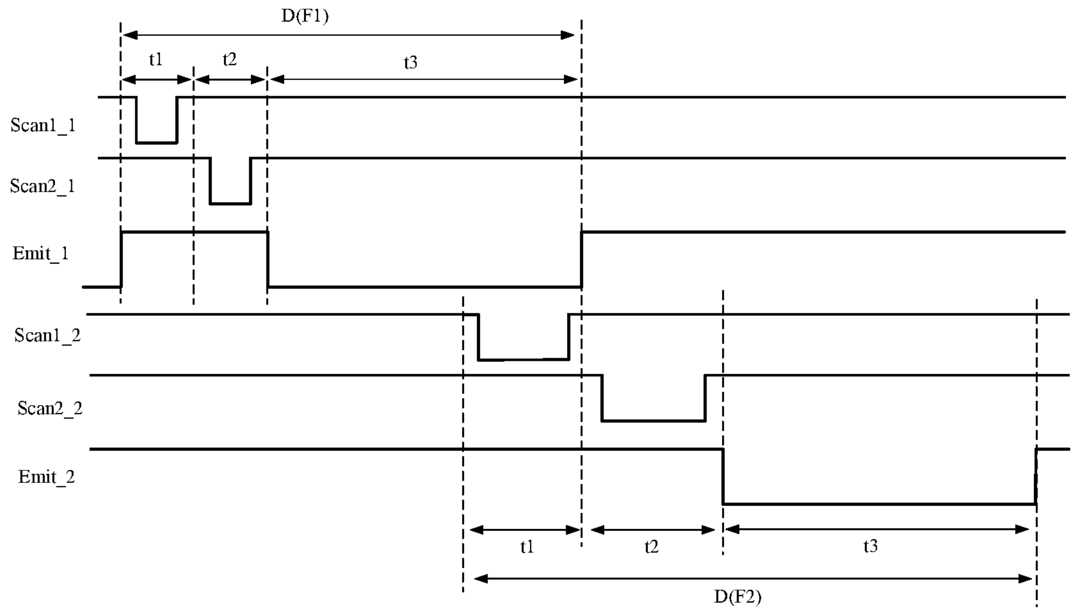
FIG. 12 is another timing sequence provided by embodiments of the present disclosure.
Figure 13:
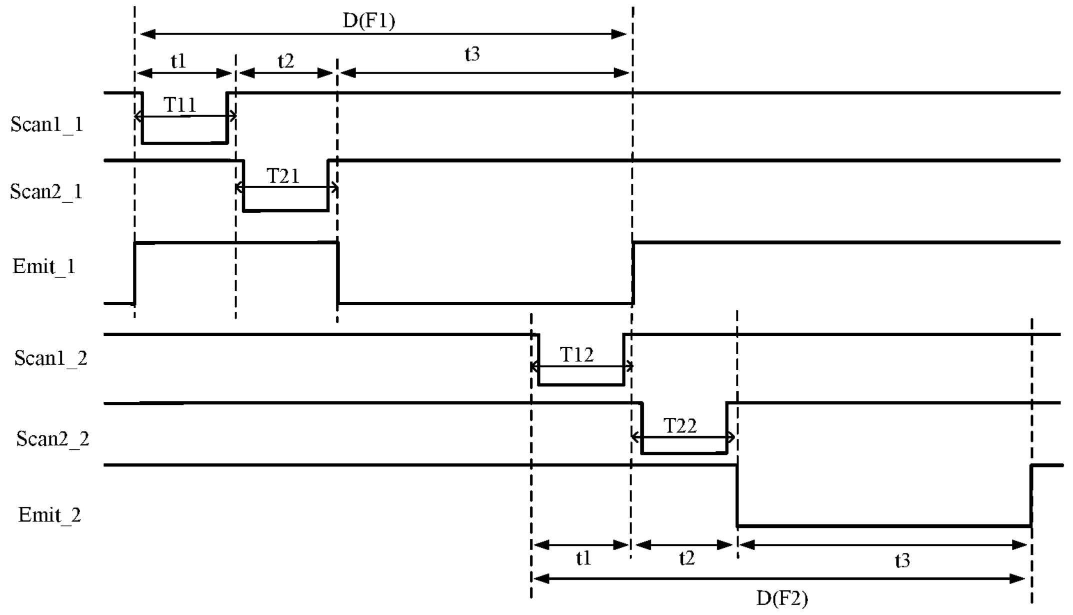
FIG. 13 is another timing sequence provided by embodiments of the present disclosure.

FIG. 12 is another timing sequence provided by some embodiments of the present disclosure, and FIG. 13 is another timing sequence provided by some embodiments of the present disclosure. In some embodiments, as shown in FIG. 12 and FIG. 13, the pixel circuit 200 executes a reset phase t1, a data writing phase t2 and a light-emitting control phase t3 in sequence within its display phase D during which the pixel circuit 200 operates. The light-emitting control phase t3 executed by the first pixel circuit 201 and the reset phase t1 executed by the second pixel circuit 202 overlap with each other.

With such a configuration, when the first pixel circuit 201 executes the light-emitting control phase t3, the second pixel circuit 202 can start to execute the reset phase t1. At this time, the holding time of the second pixel circuit 202 within its work cycle can also be shortened, which extends the reset phase t1 executed by the second pixel circuit 202 and/or the data writing phase t2 executed by the second pixel circuit 202, thereby extending the reset time and the charging time of the second pixel circuit 202.

Figure 14:
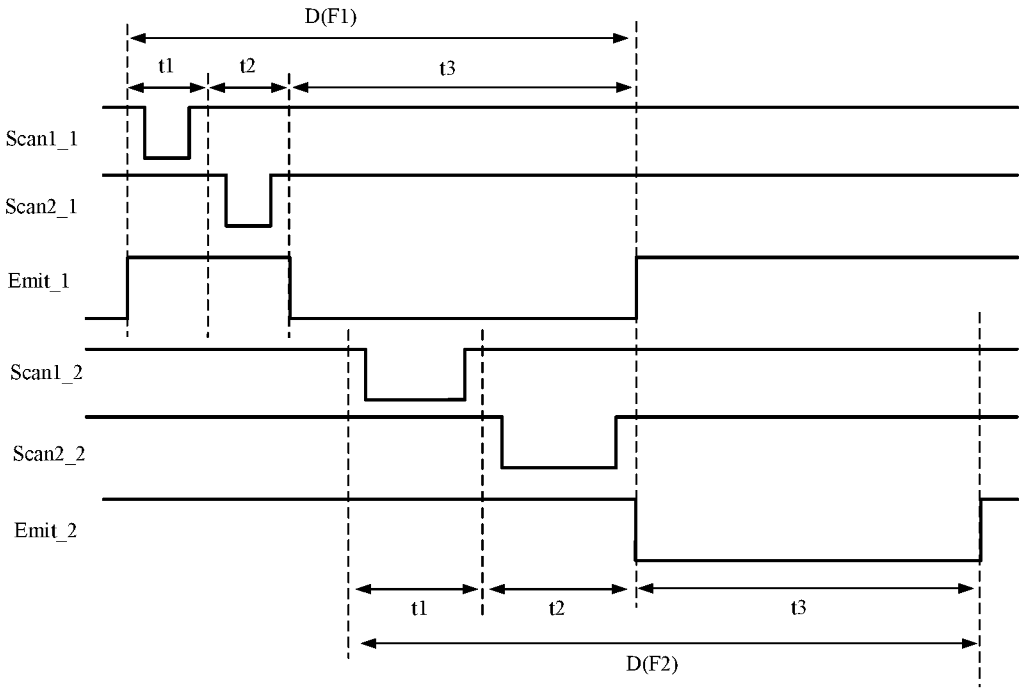
FIG. 14 is another timing sequence provided by embodiments of the present disclosure.
Figure 15:
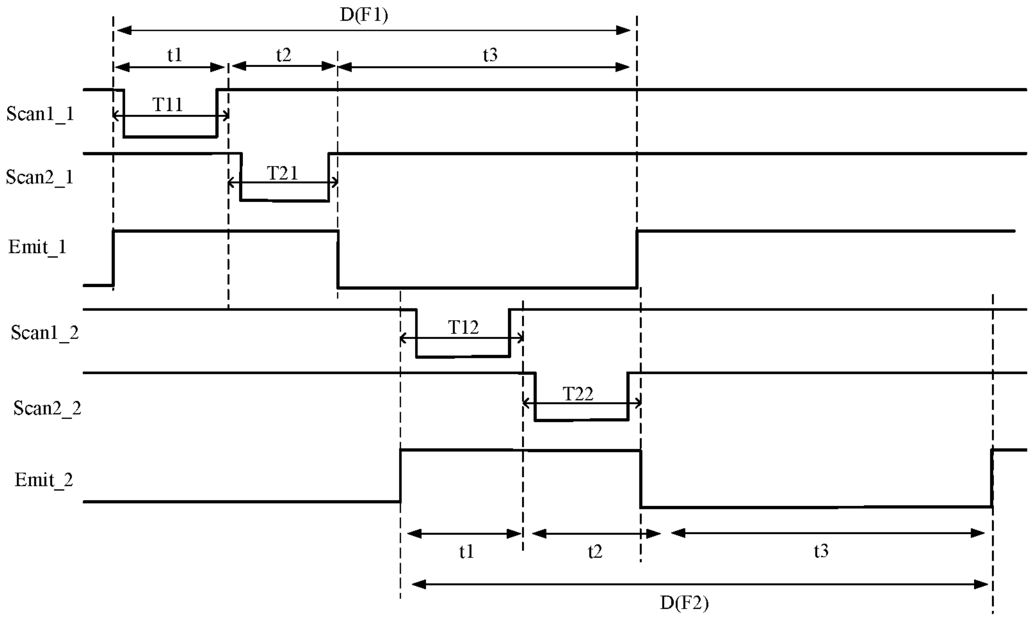
FIG. 15 is another timing sequence provided by embodiments of the present disclosure.

FIG. 14 is another timing sequence provided by some embodiments of the present disclosure, and FIG. 15 is another timing sequence provided by some embodiments of the present disclosure. In some embodiments, as shown in FIG. 14 and FIG. 15, the pixel circuit 200 executes the reset phase t1, the data writing phase t2, and the light-emitting control phase t3 in sequence within its display phase D during which the pixel circuit 200 operates. The light-emitting control phase t3 executed by the first pixel circuit 201 overlaps with the reset phase t1 and the data writing phase t2 that are executed by the second pixel circuit 202, so as to extend the reset phase t1 executed by the second pixel circuit 202 and/or the data writing phase t2 executed by the second pixel circuit 202.

In some embodiments, referring to FIG. 10, FIG. 13 and FIG. 15 again, the pixel circuit 200 sequentially executes the reset phase t1, the data writing phase t2 and the light-emitting control phase t3 within a refresh period during which the pixel circuit 200 operates. A duration T11 of the reset phase t1 executed by the first pixel circuit 201 is equal to a duration T12 of the reset phase t1 executed by the second pixel circuit 202, and a duration T21 of the data writing phase t2 executed by the first pixel circuit 201 is equal to a duration T22 of the data writing phase t2 executed by the second pixel circuit 202.

That is, in the embodiments of the present disclosure, the reset time and the charging time of the second pixel circuit 202 can be extended, and at the same time, the reset time and the charging time of the first pixel circuit 201 can also be adjusted, so that the reset time of the two pixel circuits 200 can have a same duration and the charging time of the two pixel circuits 200 can also have a same duration. Therefore, during the operation of the two pixel circuits 200, the two pixel circuits 200 have a uniform reset effect and a uniform charging effect, and the brightness uniformity is better when the two pixel circuits 200 drive the light-emitting element 100 to emit light.

In some embodiments, referring to FIG. 2 again, the display panel further includes a power supply signal line PVDD configured to provide a power supply signal, and the M pixel circuits 200 electrically connected to a same light-emitting element 100 are electrically connected to different power supply signals, respectively. As shown in FIG. 2, the M pixel circuits 200 respectively electrically connected to the power supply signal lines PVDD are labeled as PVDD_1 to PVDD_M, respectively.

When the M pixel circuits 200 electrically connected to a same light-emitting element 100 are respectively electrically connected to different power supply signal lines PVDD, in a process in which one of the pixel circuits 200 drives the light-emitting element 100, by stopping providing power supply signals to the power supply signal lines PVDD electrically connected to the remaining pixel circuits 200, the remaining pixel circuits 200 cannot receive the power supply signal and thus cannot operate in a normal state, so that the remaining pixel circuits 200 are prevented from affecting the normal light-emitting of the light-emitting element 100, thereby improving the light-emitting reliability.

In some embodiments, referring to FIG. 2 again, the M pixel circuits 200 electrically connected to the same light-emitting element 100 can also be electrically connected to different first reset signal lines Vref1_1 to Vref1_M and different second reset signal lines Vref2_1 to Vref2_M, respectively. During the process in which one of the pixel circuits 200 drives the light-emitting element 100, the power supply signals are no longer supplied to the first reset signal lines Vref1 and the second reset signal lines Vref2 that are electrically connected to the remaining pixel circuits 200.

Figure 16:
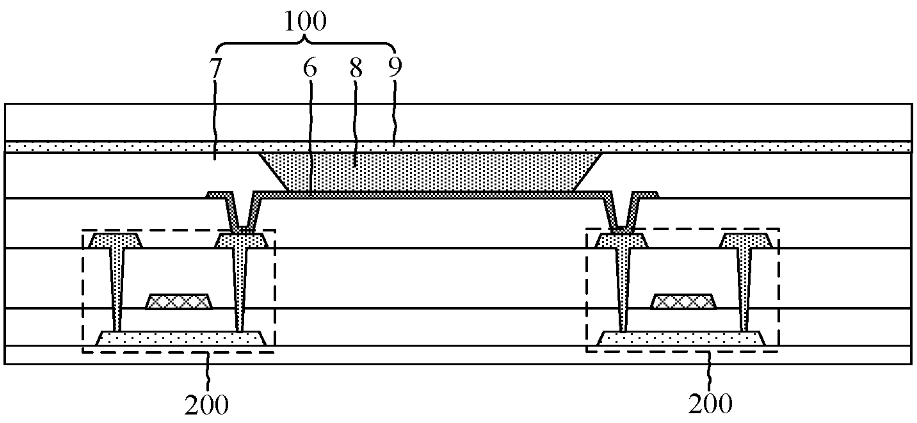
FIG. 16 is a schematic diagram of a layer structure of a light-emitting element provided by embodiments of the present disclosure.

FIG. 16 is a schematic diagram of a layer structure of a light-emitting element provided by some embodiments of the present disclosure. In some embodiments, as shown in FIG. 16, the light-emitting element 100 includes an anode 6, a pixel definition layer 7 provided on a side of the anode 6, a light-emitting layer 8 provided on a side of the pixel definition layer 7, and a cathode 9 provided on a side of the light-emitting layer 8 facing away from the anode 6. The pixel definition layer 7 includes an opening for accommodating the light-emitting layer 8, and the light-emitting layer 8 is arranged in the opening. The anode 6 overlaps with the opening in a direction perpendicular to a plane of the display panel, so that the anode 6 is in contact with the light-emitting layer 8 and it is ensured that the light-emitting layer 8 can emit light under the driving of the anode 6.

In some embodiments, referring to FIG. 16 again, the anode 6 is electrically connected to the M pixel circuits 200. In this structure, the anode 6 of the light-emitting element 100 is a continuous electrode block. Since the light-emitting element 100 is connected to all M pixel circuits 200, when any one pixel circuit 200 transmits a driving current to the anode 6, the light-emitting element 100 drives the light-emitting layer 8 to emit light utilizing a voltage difference between the anode 6 and the cathode 9. With the whole-piece anode 6, a whole surface of the anode 6 is in contact with a whole surface of the light-emitting layer 8, and no matter which pixel circuit 200 transmits the driving current to the anode 6, the light-emitting layer 8 can emit light under the whole-piece anode 6, and the light-emitting uniformity of the light-emitting layer 8 at different positions is improved.

Figure 17:
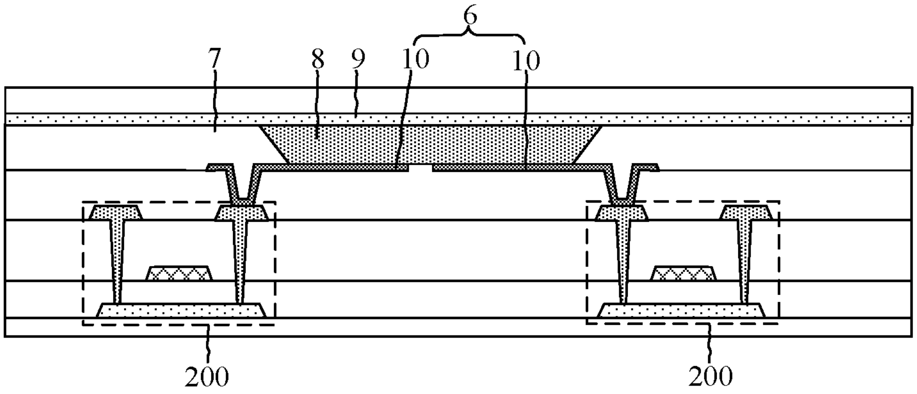
FIG. 17 is another schematic diagram of a layer structure of a light-emitting element provided by embodiments of the present disclosure.

FIG. 17 is a schematic diagram of another layer structure of a light-emitting element provided by some embodiments of the present disclosure. In some embodiments, as shown in FIG. 17, the anode 6 includes M sub-electrodes 10 arranged at intervals, the sub-electrodes 10 overlap with the light-emitting layer 8 in the direction perpendicular to the plane of the display panel, and the M sub-electrodes 10 are electrically connected to the M pixel circuits 200 in one-to-one correspondence.

In this structure, the anode 6 of the light-emitting element 100 is divided into a plurality of independent sub-anodes 6, and each sub-anode 6 is electrically connected to a pixel circuit 200. When one pixel circuit 200 transmits the driving current to a sub-anode 6 electrically connected to the pixel circuit 200, the light-emitting element 100 can use a voltage difference between the sub-anode 6 and the cathode 9 to drive the light-emitting layer 8 to emit light.

Figure 18:
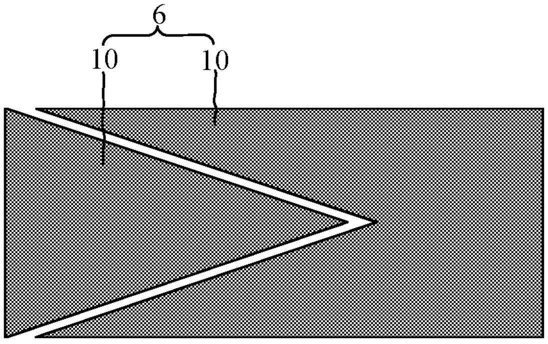
FIG. 18 is a structural schematic diagram of a sub-anode provided by embodiments of the present disclosure.
Figure 19:
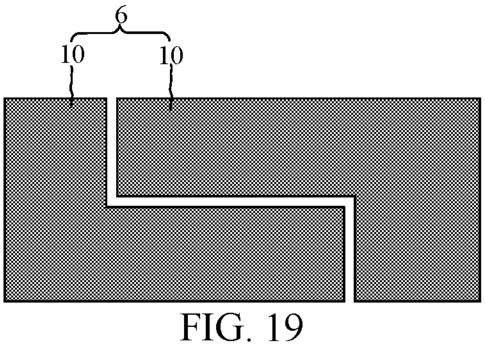
FIG. 19 is another structural schematic diagram of a sub-anode provided by embodiments of the present disclosure.
Figure 20:
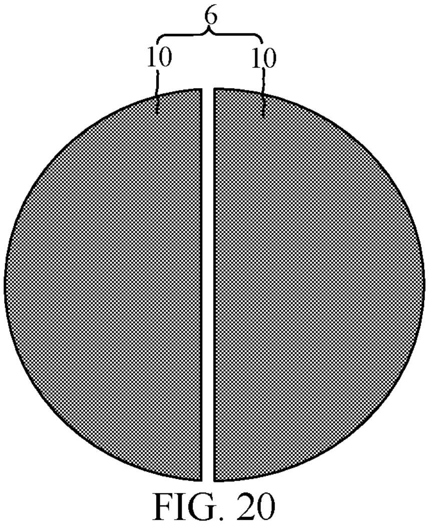
FIG. 20 is another structural schematic diagram of a sub-anode provided by embodiments of the present disclosure.

FIG. 18 is a schematic diagram of a sub-anode provided by some embodiments of the present disclosure, FIG. 19 is another schematic diagram of a sub-anode provided by some embodiments of the present disclosure, and FIG. 20 is another schematic diagram of a sub-anode provided by some embodiments of the present disclosure. In some embodiments, as shown in FIG. 18 to FIG. 20, orthographic projections of different sub-electrodes 10 in the direction perpendicular to the plane of the display panel have a same area. In this case, when different sub-electrodes 10 receive a same driving current, the driving degrees of the sub-electrodes 10 to the light-emitting layer 8 are the same, and the light-emitting brightness of the light-emitting layer 8 tends to be the same.

In some embodiments, referring to FIG. 18 to FIG. 20 again, an orthographic projection of an outer contour of the anode 6 in the direction perpendicular to the plane of the display panel is square or circular.

Taking the anode 6 including two sub-electrodes 10 as an example, when the orthographic projection of the outer contour of the anode 6 in the direction perpendicular to the plane of the display panel is square, referring to FIG. 18, an orthographic projection of an outer contour of one of the two sub-electrodes 10 in the direction perpendicular to the plane of the display panel can be triangular. In some embodiments, referring to FIG. 19, orthographic projections of outer contours of the two sub-electrodes 10 in the direction perpendicular to the plane of the display panel can be L-shaped. When the orthographic projection of the outer contour of the anode 6 in the direction perpendicular to the plane of the display panel is circular, referring to FIG. 20, the orthographic projections of the outer contours of the two sub-electrodes 10 in the direction perpendicular to the plane of the display panel can have a shape of a sector having an angle of 180°.

In this way, on the premise of ensuring that the orthographic projections of the sub-electrodes 10 have a same area, the shapes of the sub-electrodes 10 are more regular, which is conducive to the graphic design of the sub-electrodes 10.

In some embodiments, referring to FIG. 2 and FIG. 3, the gate reset module 1 includes a gate reset transistor M1. The gate reset transistor M1 includes a gate electrode electrically connected to the first scanning signal line Scan', a first electrode electrically connected to the first reset signal line Vref1, and a second electrode electrically connected to the gate electrode of the driving transistor M0. During the reset phase t1, the gate reset transistor M1 is turned on when the first scanning signal line Scan1 provides an effective level to the gate reset transistor M1, and the anode reset transistor M2 transmits the gate reset signal to the gate electrode of the driving transistor M0 to reset the gate electrode of the driving transistor M0.

The anode 6 reset module includes an anode reset transistor M2. The anode reset transistor M2 includes a gate electrode electrically connected to the first scanning signal line Scan1, a first electrode electrically connected to the second reset signal line Vref2, and a second electrode electrically connected to the anode 6 of the light-emitting element 100. During the reset phase t1, the anode reset transistor M2 is turned on when the first scanning signal line Scan1 provides an effective level to the anode reset transistor M2, and the anode reset transistor M2 transmits the anode reset signal to the anode of the light-emitting element 100 to reset the anode of the light-emitting element 100.

The charging module 3 includes a data writing transistor M3 and a threshold compensation transistor M4. The data writing transistor M3 includes a gate electrode electrically connected to the second scanning signal line Scan2, a first electrode electrically connected to the data line Data, and a second electrode electrically connected to the first electrode of the driving transistor M0. The threshold compensation transistor M4 includes a gate electrode electrically connected to the second scanning signal line Scan2, a first electrode electrically connected to the second electrode of the driving transistor M0, and a second electrode electrically connected to the gate electrode of the transistor M0. During the data writing phase t2, the data writing transistor M3 and the threshold compensation transistor M4 are turned on when effective levels provided by the second scanning signal line Scan2 to the data writing transistor M3 and the threshold compensation transistor M4, and the data signal is transmitted to the gate electrode of the driving transistor M0, and a threshold of the driving transistor M0 are compensated.

The light-emitting control module 4 includes a first light-emitting control transistor M5 and a second light-emitting control transistor M6. The first light-emitting control transistor M5 includes a gate electrode electrically connected to the light-emitting control signal line Emit, a first electrode electrically connected to the power supply signal line PVDD, and a second electrode electrically connected to the first electrode of the driving transistor M0. The second light-emitting control transistor M6 includes a gate electrode electrically connected to the light-emitting control signal line Emit, a first electrode electrically connected to the second electrode of the driving transistor M0, and a second electrode electrically connected to the anode of the light-emitting element 100. During the light-emitting control stage t3, the first light-emitting control transistor M5 and the second light-emitting control transistor M6 are turned on when effective levels provided by the light-emitting control signal line Emit are provided to the first light-emitting control transistor M5 and the second light-emitting control transistor M6, and the driving current converted by the power supply signal and the data signal are transmitted to the light-emitting element 100, so as to drive the light-emitting element 100 to emit light.

Some embodiments of the present disclosure further provide a method for driving a display panel, which is used for driving the above-mentioned display panel. The method includes: controlling the M pixel circuits 200 to drive the light-emitting element 100 to emit light respectively during different display phases D of the display panel.

In the embodiments of the present disclosure, by controlling multiple pixel circuits 200 to respectively drive the light-emitting element 100 to emit light respectively during different display phases D, the display panel can be refreshed in a high-frequency, so that the pixel circuits 200 in the display panel can operate at a low frequency, thereby reducing the service life loss of the transistors of the pixel circuit 200. In other words, since the operating frequency of the pixel circuit 200 in the embodiments of the present disclosure does not need to be consistent with the refresh frequency of the display panel, the refresh frequency of the display panel can be improved while ensuring that the pixel circuit 200 operates at a low frequency to improve the display effect.

In some embodiments, the process of controlling the M pixel circuits 200 to respectively drive the light-emitting element 100 to emit light respectively during different display phases D includes: controlling the M pixel circuits 200 to alternately drive the light-emitting element 100 to emit light respectively during different display phases D, so that the pixel circuits 200 operate at a same operating frequency, and service life attenuation degrees of the transistors of the circuits are the same. The corresponding relationship between the display phases D and the one frame period has been described in the above embodiments, and will not be repeated herein.

In some embodiments, the process of controlling the M pixel circuits 200 to drive the light-emitting element 100 to emit light respectively during different display phases D includes: when a to-be-refreshed frequency of the display panel is higher than a preset refresh frequency, controlling the M pixel circuits 200 to drive the light-emitting element 100 to emit light respectively during different display phases D.

The method can further include: when the to-be-refreshed frequency of the display panel is lower than or equal to the preset refresh frequency, only controlling N pixel circuits 200 to drive the light-emitting element 100 to emit light respectively during different display phases D, N<M. The preset refresh frequency can be 360 Hz, 240 Hz, 120 Hz, or 90 Hz.

In the above method, when the display panel is refreshed at a high frequency, by controlling the M pixel circuits 200 to respectively drive the light-emitting element 100 to emit light respectively during different display phases D, the operating frequency of a single pixel circuit 200 can be reduced, thereby reducing the service life attenuation degrees of the transistors. When the display panel is refreshed at a low frequency, only some pixel circuits 200 of the M pixel circuits 200 can be controlled to operate respectively during different display phases D while the remaining pixel circuits 200 do not operate. Since the refresh frequency of the display panel is low, these operating pixel circuits 200 can still operate at a low frequency.

In some embodiments, N=1, that is, when the to-be-refreshed frequency of the display panel is lower than or equal to the preset refresh frequency, only one of the M pixel circuits 200 is controlled to be turned on respectively during different display phases D. In this case, the operating frequency of the pixel circuit 200 is equal to the refresh frequency of the display panel, but since the refresh frequency of the display panel is low, the operating frequency of the pixel circuit 200 is correspondingly low. The configuration where only one pixel circuit 200 is controlled to operate has a simple driving method and is easier to be achieved.

In some embodiments, referring to FIG. 2 and FIG. 3, M pixel circuits 200 electrically connected to a same light-emitting element 100 are respectively electrically connected to different scanning signal lines and are respectively electrically connected to different light-emitting control signal lines Emit. For example, the M pixel circuits 200 electrically connected to a same light-emitting element 100 are electrically connected to different first scanning signal lines Scan1_1 to Scan1_M, respectively, and are electrically connected to different light-emitting control signal lines Emit_1 to Emit_M.

When the to-be-refreshed frequency of the display panel is lower than or equal to the preset refresh frequency, a non-enable level can be provided to the scanning signal lines and/or the light-emitting control signal lines Emit electrically connected to the remaining (M-N) pixel circuits 200 to ensure the remaining (M-N) pixel circuits 200 are in a non-operating state, so as to prevent the pixel circuits 200 from affecting the normal light-emitting of the light-emitting element 100.

Figure 21:
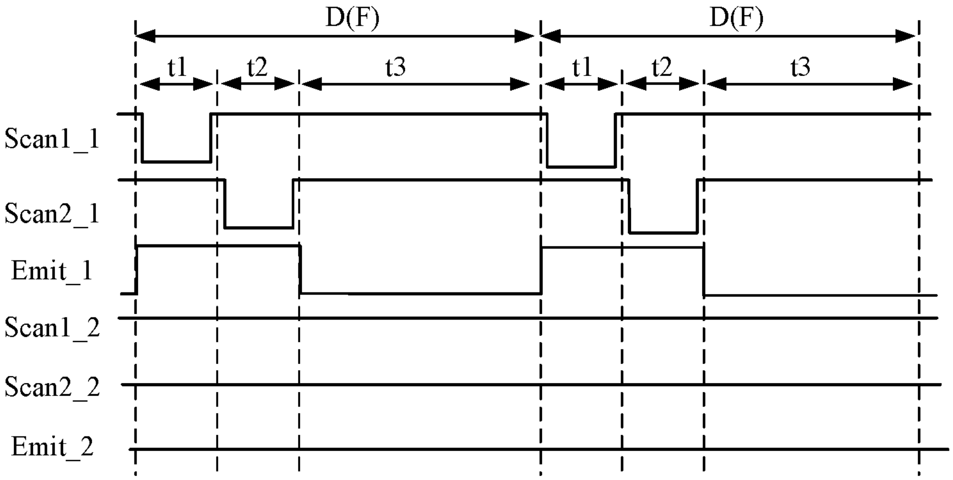
FIG. 21 is another timing sequence provided by embodiments of the present disclosure.

FIG. 21 is another timing sequence provided by some embodiments of the present disclosure. Taking M=2, N=1, and the display phase D includes a frame period as an example, when the to-be-refreshed frequency of the display panel is lower than or equal to the preset refresh frequency, as shown in FIG. 21, only a first one of the M pixel circuits operates during each frame period, therefore, during each frame period, only the first scanning signal line Scan1_1, the second scanning signal line Scan2_1 and the light-emitting control signal line Emit_1 provide effective levels (low level) during corresponding phases, and the first scanning signal line Scan1_2, the second scanning signal line Scan2_2 and the light-emitting control signal line Emit_2 always provide an ineffective level (high level) during each frame period.

In some embodiments, when the to-be-refreshed frequency of the display panel is lower than or equal to the preset refresh frequency, signals are no longer supplied to the scanning signal lines and/or light-emitting control signal lines that are electrically connected to the remaining (M-N) pixel circuits 200, so as to ensure that the remaining (M-N) pixel circuits 200 do not operate while the power consumption of the display panel can be reduced.

In some embodiments, referring to FIG. 2, M pixel circuits 200 electrically connected to the same light-emitting element 100 are electrically connected to different power supply signal lines PVDD, respectively. When the to-be-refreshed frequency of the display panel is lower than or equal to the preset refresh frequency, signals can be no longer supplied to the power supply signal line PVDD electrically connected to the remaining (M-N) pixel circuits 200 to ensure that the remaining M-N pixel circuits 200 do not operate and prevent the remaining pixel circuits 200 from affecting the normal light-emitting of the light-emitting element 100.

Figure 22:
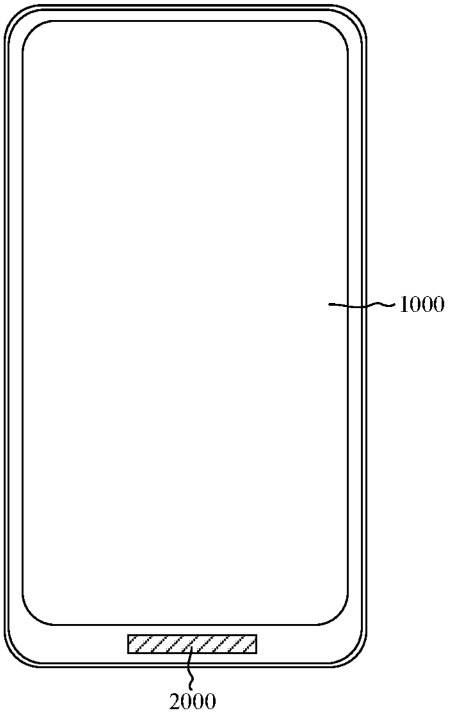
FIG. 22 is a structural schematic diagram of a display apparatus provided by embodiments of the present disclosure.

Some embodiment of the present disclosure also provides a display apparatus. FIG. 22 is a schematic diagram of the display apparatus provided by some embodiments of the present disclosure. As shown in FIG. 22, the display apparatus includes the above display panel 1000. The display apparatus shown in FIG. 22 is only schematic illustrated, and the display apparatus can be any electronic device with a display function, such as a mobile phone, a tablet computer, a laptop computer, an electronic paper book, or a TV.

In some embodiments, referring to FIG. 22 again, the display apparatus further includes a driving chip 2000, and the driving chip 2000 is configured to:

when the to-be-refreshed frequency of the display panel is higher than the preset refresh frequency, control the M pixel circuits 200 to drive the light-emitting element 100 to emit light respectively during different display phases D of the display panel; and when the to-be-refreshed frequency of the display panel is lower than or equal to the preset refresh frequency, control N pixel circuits 200 to drive the light-emitting element 100 to emit light respectively during different display phases D, N<M.

When the display panel is refreshed at a high frequency, by controlling the M pixel circuits 200 to drive the light-emitting element 100 to emit light respectively during different display phases D, the operating frequency of a single pixel circuit 200 can be reduced, thereby reducing the service life attenuation degrees of the transistors of the pixel circuit 200. When the display panel is refreshed at a low frequency, only some pixel circuits 200 of the M pixel circuits 200 can be controlled to operate respectively during different display phases D while the remaining pixel circuits 200 do not operate. These operating pixel circuits 200 can still ensure a low operating frequency.

The above are merely some embodiments of the present disclosure, which, as mentioned above, are not intended to limit the present disclosure. Within the principles of the present disclosure, any modification, equivalent substitution, improvement shall fall into the protection scope of the present disclosure.

Finally, it can be understood that the above embodiments are only used to illustrate the technical solutions of the present disclosure, but not to limit them; although the present disclosure has been described in detail with reference to the foregoing embodiments, those of ordinary skill in the art should understand that the technical solutions described in the foregoing embodiments can still be modified, or some or all of the technical features thereof can be equivalently replaced. These modifications or replacements do not make the essence of the corresponding technical solutions deviate from the scope of the technical solutions of the embodiments of the present disclosure.

What is claimed is:

1. A display panel, comprising:

a plurality of light-emitting elements, wherein each one of the plurality of light-emitting elements is electrically connected to M pixel circuits, M is a positive integer greater than or equal to 2, and the M pixel circuits are configured for driving the plurality of light-emitting elements to emit light respectively during different display phases of the display panel; and wherein each one of the M pixel circuits is configured for sequentially executing a reset phase, a data writing phase, and a light-emitting control phase in one of the display phases during operation of the pixel circuit, and wherein the light-emitting control phases executed by the M pixel circuits do not overlap with one another.

2. The display panel according to claim 1, wherein M=2.

3. The display panel according to claim 1, wherein the M pixel circuits that are electrically connected to a same light-emitting element are electrically connected to different scanning signal lines and different light-emitting control signal lines.

4. The display panel according to claim 1, wherein the M pixel circuits that are electrically connected to a same light-emitting element are electrically connected to at least one of a same data line and a same constant potential signal line.

5. The display panel according to claim 4, further comprising:

a first reset signal line configured to provide a gate reset signal;

a second reset signal line configured to provide an anode reset signal; and a power supply signal line configured to provide a power supply signal, wherein the constant potential signal line comprises at least one of the first reset signal line, the second reset signal line, and the power supply signal line.

6. The display panel according to claim 1, wherein the M pixel circuits comprise a first pixel circuit and a second pixel circuit, and the display phases executed by the first pixel circuit and the second pixel circuit do not overlap with each other.

7. The display panel according to claim 1, wherein the M pixel circuits comprise a first pixel circuit and a second pixel circuit, and the display phases executed by the first pixel circuit and the second pixel circuit overlap with each other.

8. The display panel according to claim 7, wherein each of the M pixel circuits is configured for sequentially executing a reset phase, a data writing phase, and a light-emitting control phase in one of the display phases during operation of the pixel circuit; and the data writing phase executed by the first pixel circuit overlaps with the reset phase executed by the second pixel circuit, and the light-emitting control phase executed by the first pixel circuit overlaps with the data writing phase executed by the second pixel circuit.

9. The display panel according to claim 7, wherein each one of the M pixel circuits is configured for sequentially executing a reset phase, a data writing phase, and a light-emitting control phase in one of the display phases during operation of the pixel circuit; and the light-emitting control phase executed by the first pixel circuit overlaps with the reset phase executed by the second pixel circuit.

10. The display panel according to claim 7, wherein each of the M pixel circuits is configured for sequentially executing a reset phase, a data writing phase, and a light-emitting control phase in one of the display phases during operation of the pixel circuit; and the reset phase and the data writing phase that are executed by the second pixel circuit overlaps with the light-emitting control phase executed by the first pixel circuit.

11. The display panel according to claim 7, wherein each of the M pixel circuits is configured for sequentially executing a reset phase, a data writing phase, and a light-emitting control phase in one of the display phase during operation of the pixel circuit;

a duration T11 of the reset phase executed by the first pixel circuit is equal to a duration T12 of the reset phase executed by the second pixel circuit; and a duration T21 of the data writing phase executed by the first pixel circuit is equal to a duration T22 of the data writing phase executed by the second pixel circuit.

12. The display panel according to claim 1, wherein each one of the plurality of light-emitting elements comprises an anode, a pixel definition layer located on a side of the anode, a light-emitting layer located on a side of the pixel definition layer, and a cathode located on a side of the light-emitting layer facing away from the anode; and the pixel definition layer comprises an opening for accommodating the light-emitting layer, and the anode overlaps with the opening in a direction perpendicular to a plane of the display panel.

13. The display panel according to claim 12, wherein the anode is electrically connected to the M pixel circuits.

14. The display panel according to claim 12, wherein the anode comprises M sub-electrodes arranged at intervals; the M sub-electrodes overlap with the light-emitting layer in the direction perpendicular to the plane of the display panel, and the M sub-electrodes are electrically connected to the M pixel circuits in a one-to-one correspondence.

15. The display panel according to claim 14, wherein orthographic projections of different sub-electrodes of the M sub-electrodes in the direction perpendicular to the plane of the display panel have a same area.

16. The display panel according to claim 12, wherein an orthographic projection of an outer contour of the anode in the direction perpendicular to the plane of the display panel has a square or circular shape.

17. The display panel according to claim 1, wherein each one of the M pixel circuits comprises:

a driving transistor;

a gate reset module comprising a gate reset transistor, wherein the gate reset module is electrically connected to a first scanning signal line, a first reset signal line, and a gate electrode of the driving transistor; and the gate reset module is configured to write a first reset signal to the gate electrode of the driving transistor in response to a first scanning signal during a reset phase;

an anode reset module comprising an anode reset transistor, wherein the anode reset module is electrically connected to the first scanning signal line, a second reset signal line, and an anode of one of the plurality of light-emitting elements; and the anode reset module is configured to write a second reset signal to the anode of one of the plurality of light-emitting elements in response to the first scanning signal during a reset phase;

a charging module comprising a data writing transistor and a threshold compensation transistor, wherein the charging module is electrically connected to a second scanning signal line, a data line, a first electrode of the driving transistor, a second electrode of the driving transistor, and the gate electrode of the driving transistor; and the charging module is configured to, in response to the second scanning signal, write a data signal to the gate electrode of the driving transistor and to compensate a threshold of the driving transistor during a data writing phase; and a light-emitting control module comprising a first light-emitting control transistor and a second light-emitting control transistor, wherein the light-emitting control module is electrically connected to a light-emitting control signal line, a power supply signal line, the first electrode of the driving transistor, the second electrode of the driving transistor, and the anode of one of the plurality of light-emitting elements; and the light-emitting control module is configured to transmit a driving current converted by the driving transistor to the anode of one of the plurality of light-emitting elements in response to a light-emitting control signal during a light-emitting control phase.

18. The display panel according to claim 17, wherein the gate reset transistor comprises a gate electrode electrically connected to the first scanning signal line, a first electrode electrically connected to the first reset signal line, and a second electrode electrically connected to the gate electrode of the driving transistor;

wherein the anode reset transistor comprises a gate electrode electrically connected to the first scanning signal line, a first electrode electrically connected to the second reset signal line, and a second electrode electrically connected to the anode of one of the plurality of light-emitting elements;

wherein the data writing transistor comprises a gate electrode electrically connected to the second scanning signal line, a first electrode electrically connected to the data line, and a second electrode electrically connected to the first electrode of the driving transistor; and the threshold compensation transistor comprises a gate electrode electrically connected to the second scanning signal line, a first electrode electrically connected to a second electrode of the driving transistor, and a second electrode electrically connected to the gate electrode of the driving transistor; and wherein the first light-emitting control transistor comprises a gate electrode electrically connected to the light-emitting control signal line, a first electrode electrically connected to the power supply signal line, and a second electrode electrically connected to a first electrode of the driving transistor; and the second light-emitting control transistor comprises a gate electrode electrically connected to the light-emitting control signal line, a first electrode electrically connected to the second electrode of the driving transistor, and a second electrode electrically connected to the anode of one of the plurality of light-emitting elements.

19. A method for driving a display panel, wherein the display panel comprises: a plurality of light-emitting elements, wherein each one of the plurality of light-emitting elements is electrically connected to M pixel circuits, M is a positive integer greater than or equal to 2, and the M pixel circuits are configured for driving the plurality of light-emitting elements to emit light respectively during different display phases of the display panel; and wherein each one of the M pixel circuits is configured for sequentially executing a reset phase, a data writing phase, and a light-emitting control phase in one of the display phases during operation of the pixel circuit, and wherein the light-emitting control phases executed by the M pixel circuits do not overlap with one another;

the method comprising:

controlling the M pixel circuits to drive one of the plurality of light-emitting elements to emit light respectively during different display phases of the display panel, wherein said controlling the M pixel circuits to drive one of the plurality of light-emitting elements to emit light respectively during different display phases of the display panel, comprises: when a to-be-refreshed frequency of the display panel is greater than a preset refresh frequency, controlling the M pixel circuits to drive the plurality of light-emitting elements to emit light respectively during different display phases of the display panel.

20. The method according to claim 19, wherein said controlling the M pixel circuits to drive one of the plurality of light-emitting elements to emit light respectively during different display phases of the display panel comprises:

controlling the M pixel circuits to alternately drive one of the plurality of light-emitting elements to emit light respectively during different display phases.

21. The method according to claim 19, further comprising: when the to-be-refreshed frequency of the display panel is lower than or equal to the preset refresh frequency, controlling N pixel circuits of the M pixel circuits to drive one of the plurality of light-emitting elements to emit light respectively during different display phases, where N<M.

22. The method according to claim 21, wherein N=1.

23. The method according to claim 21, wherein the M pixel circuits electrically connected to a same light-emitting element are electrically connected to different scanning signal lines; and the M pixel circuits that are electrically connected to a same light-emitting element are electrically connected to different light-emitting control signal lines; and when the to-be-refreshed frequency of the display panel is lower than or equal to the preset refresh frequency, a non-enable level is provided to the scanning signal lines electrically connected to remaining (M−N) pixel circuits and/or the light-emitting control signal lines electrically connected to the remaining (M−N) pixel circuits, or signals are no longer provided to the scanning signal lines electrically connected to remaining (M−N) pixel circuits and/or the light-emitting control signal lines electrically connected to the remaining (M−N) pixel circuits.

24. A display apparatus, comprising a display panel, wherein the display panel comprises: a plurality of light-emitting elements, wherein each one of the plurality of light-emitting elements is electrically connected to M pixel circuits, M is a positive integer greater than or equal to 2, and the M pixel circuits are configured to drive the plurality of light-emitting elements to emit light respectively during different display phases of the display panel; and wherein each one of the M pixel circuits is configured for sequentially executing a reset phase, a data writing phase, and a light-emitting control phase in one of the display phases during operation of the pixel circuit, and wherein the light-emitting control phases executed by the M pixel circuits do not overlap with one another.

25. The display apparatus according to claim 24, further comprising:

a driving chip, wherein the driving chip is configured to control the M pixel circuits to drive one of the plurality of light-emitting elements to emit light respectively during different display phases of the display panel when a to-be-refreshed frequency of the display panel is higher than a preset refresh frequency, and to control N pixel circuits of the M pixel circuits to drive one of the plurality of light-emitting elements to emit light respectively during different display phases when the to-be-refreshed frequency of the display panel is lower than or equal to the preset refresh frequency, where N<M.

* * * * *